United States Patent
Kim et al.

(10) Patent No.: US 9,282,511 B2
(45) Date of Patent: Mar. 8, 2016

(54) METHOD FOR MANAGING POWER SAVE MODE IN WIRELESS LAN SYSTEM, AND DEVICE FOR SUPPORTING SAME

(75) Inventors: Suh Wook Kim, Anyang-si (KR); Yong Ho Seok, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 13/991,818

(22) PCT Filed: Dec. 6, 2011

(86) PCT No.: PCT/KR2011/009369
§ 371 (c)(1),
(2), (4) Date: Jun. 5, 2013

(87) PCT Pub. No.: WO2012/077952
PCT Pub. Date: Jun. 14, 2012

(65) Prior Publication Data
US 2013/0250832 A1    Sep. 26, 2013

Related U.S. Application Data

(60) Provisional application No. 61/420,327, filed on Dec. 7, 2010, provisional application No. 61/424,677, filed on Dec. 20, 2010.

(51) Int. Cl.
*H04W 52/02*    (2009.01)
*H04W 88/18*    (2009.01)
(Continued)

(52) U.S. Cl.
CPC ...... *H04W 52/0206* (2013.01); *H04W 52/0216* (2013.01); *H04W 74/06* (2013.01); *H04W 76/048* (2013.01); *Y02B 60/50* (2013.01)

(58) Field of Classification Search
CPC ............ H04W 52/02; H04W 52/0216; H04W 88/187; H04W 74/04; H04W 72/0446; H04W 84/12; H04W 28/04; H04B 7/212; H04B 7/2123; H04B 7/2643; H04B 7/2656; H04L 12/2801

USPC ......... 370/311, 314, 321, 336, 337, 345, 442, 370/498
See application file for complete search history.

(56) References Cited

U.S. PATENT DOCUMENTS

2008/0151814 A1*  6/2008  Jokela ........................... 370/328
2008/0298290 A1* 12/2008  Wentink ....................... 370/311
(Continued)

FOREIGN PATENT DOCUMENTS

KR   10-2005-0024760 A   3/2005
KR   10-2009-0094673 A   9/2009

OTHER PUBLICATIONS

Yi-Hua Zhu et al, "Efficient Power Management for Infrastructure IEEE 802.11 WLANs," In: IEEE Transaction on Wireless Communications, Jul. 2010, vol. 9, No. 7, pp. 2196-2205.

*Primary Examiner* — Ronald B Abelson
(74) *Attorney, Agent, or Firm* — Dentons US LLP

(57) ABSTRACT

Provided is a method for operating a power save mode performed by an access point in a WLAN system. The method includes: transmitting, by an access point (AP), a first traffic indication map (TIM) broadcast indication frame to a first station (STA); transmitting, by the AP, a second TIM broadcast indication frame to a second STA; transmitting, by the AP, a first TIM frame indicating that buffered traffic to the first STA is present; and transmitting, by the AP, a second TIM frame indicating that buffered traffic to the second STA is present. The first TIM broadcast indication frame includes a first TIM offset field indicating a transmission time of the first TIM frame, and the second TIM broadcast indication frame includes a second TIM offset field indicating a transmission time of the second TIM frame.

13 Claims, 16 Drawing Sheets

(51) Int. Cl.
*H04W 74/04* (2009.01)
*H04W 72/04* (2009.01)
*H04W 84/12* (2009.01)
*H04W 28/04* (2009.01)
*H04B 7/212* (2006.01)
*H04B 7/26* (2006.01)
*H04L 12/28* (2006.01)
*H04W 74/06* (2009.01)
*H04W 76/04* (2009.01)

(56) References Cited

U.S. PATENT DOCUMENTS

2009/0010191 A1* 1/2009 Wentink ............... 370/311
2009/0252135 A1 10/2009 Benveniste

* cited by examiner

METHOD FOR MANAGING POWER SAVE MODE IN WIRELESS LAN SYSTEM, AND DEVICE FOR SUPPORTING SAME

This application is a 35 USC §371 National Stage entry of International Application No. PCT/KR2011/009369 filed on Dec. 6, 2011, and claims priority to U.S. Provisional Application Nos. 61/420,327 filed on Dec. 7, 2010 and 61/424,677 filed on Dec. 20, 2010, all of which are incorporated by reference in their entirety herein.

TECHNICAL FIELD

The present invention relates to a wireless local area network (WLAN) system, and more particularly, to a method for operating a power save mode by a station (STA) and a method for supporting the same.

BACKGROUND ART

In recent years, with the development of an information and communication technologies, various wireless communication technologies have been developed. Among them, a wireless local area network (WLAN) is a technology that can wirelessly access the Internet in a home or a company or a specific service providing region by using portable terminals such as a personal digital assistant (PDA), a laptop computer, a portable multimedia player (PMP), and the like based on a wireless frequency technology.

In order to overcome a limit for a communication speed noted as a weak point in the WLAN, IEEE 802.11n has been provided as a technological standard established comparatively recently. IEEE 802.11n aims at increasing the speed and reliability of a network and extending a managing distance of a wireless network. In more detail, IEEE 802.11n supports high throughput (HT) in which a data processing speed is equal to or higher than maximum 540 Mbps, and is based on a multiple inputs and multiple outputs (MIMO) technology using multiple antennas at both a transmitter and a receiver in order to minimize a transmission error and optimize a data speed.

In a WLAN system, an active mode and a power save mode are supported as a management mode of a station (STA). The active mode means the operating mode in which the STA operates in an awake state to transmit/receive a frame. On the contrary, operation of the power save mode is supported for power saving of the STA which need not be in an activation state in order to receive the frame. The station (STA) that supports PSM operates in a doze state not in the case where the station can access a wireless medium to prevent unnecessary power consumption. That is, the STA operates in an awake state only during a period when the frame can be transmitted to the corresponding STA or during a period when the corresponding STA can transmit the frame.

In the WLAN system, an access point (AP) manages traffic to be transmitted to the STAs that operate in the power save mode. When there is provided buffered traffic to be transmitted to a specific STA, the AP requires a method to notify the buffered traffic to the corresponding STA and transmit the frame. Further, a method is required, in which when the STA operates in the doze state, the STA determines whether the buffered traffic to the STA itself exists and when the buffered traffic exits, the doze state of the STA is switched to the awake state, and the STA can normally receive the frame.

DISCLOSURE

Technical Problem

An object of the present invention is to provide a method for operating in a power save mode by a station (STA) in a wireless local area network (WLAN) system and a apparatus for supporting the same.

Technical Solution

In accordance with an aspect of the present invention, there is provided a method for operating a power save mode performed by an access point in a WLAN system. The method includes transmitting, by an access point (AP), a first traffic indication map (TIM) broadcast indication frame to a first station (STA); transmitting, by the AP, a second TIM broadcast indication frame to a second STA; transmitting, by the AP, a first TIM frame indicating that buffered traffic to the first STA is present; and transmitting, by the AP, a second TIM frame indicating that buffered traffic to the second STA is present. The first TIM broadcast indication frame includes a first TIM offset field indicating a transmission time of the first TIM frame, and the second TIM broadcast indication frame includes a second TIM offset field indicating a transmission time of the second TIM frame.

The time indicated by the first TIM offset field and the time indicated by the second TIM offset field may be different from each other.

The transmission time of the first ITM frame may be expressed by an offset time value which elapses from a transmission time of a specific beacon frame which the AP periodically transmits.

The method may further include: entering, by the first STA, a doze state after receiving the first TIM broadcast indication frame; and operating, by the first STA, while switching to an awake state at the time indicated by the first TIM offset field.

The method may further include: entering, by the second STA, the doze state after receiving the second TIM broadcast indication frame; and operating, by the second STA, while switching to the awake state at the time indicated by the second TIM offset field.

The first STA and the second STA may be assigned with the same association identifier (AID) when the STAs are associated with the AP.

The first TIM frame may include information indicating the AID in order to notify that the buffered frame to the first STA is present.

The second TIM frame may include information indicating the AID of the second STA in order to notify that the buffered frame to the second STA is present.

The method may further include exchanging, by the AP, frames with the first STA and the second STA.

The method may further include: entering, by the first STA, the doze state when completing the frame exchange with the AP; and entering, by the second STA, the doze state when completing the frame exchange with the AP.

The first TIM frame may be periodically transmitted, and the first TIM broadcast indication frame may further include a first TIM interval field indicating a transmission period of the first TIM frame.

The second TIM frame may be periodically transmitted, and the second TIM broadcast indication frame may further include a second TIM interval field indicating a transmission period of the second TIM frame.

In accordance with another aspect of the present invention, there is provided a wireless apparatus. The apparatus includes: a transceiver transmitting and receiving a wireless signal; and a processor functionally associated with the transceiver. The processor is configured to method includes: transmit a first traffic indication map (TIM) broadcast indication frame to a first station (STA), transmit a second TIM broadcast indication frame to a second STA, transmit a first TIM frame indicating that buffered traffic to the first STA is present, and transmit a second TIM frame indicating that buffered traffic to the second STA is present, and the first TIM broadcast indication frame includes a first TIM offset field indicating a transmission time of the first TIM frame, and the second TIM broadcast indication frame includes a second TIM offset field indicating a transmission time of the second TIM frame. The first TIM broadcast indication frame includes a first TIM offset field indicating a transmission time of the first TIM frame, and the second TIM broadcast indication frame includes a second TIM offset field indicating a transmission time of the second TIM frame.

The time indicated by the first TIM offset field and the time indicated by the second TIM offset field may be different from each other.

Advantageous Effects

According to a method for operating in a power save mode according to an exemplary embodiment of the present invention, an access point (AP) can notify information on the time when a traffic indication map (TIM) frame is transmitted to an STA without a request from the STA. Therefore, the AP can respectively notify times when different TIM frames are respectively transmitted to STAs. Therefore, in a machine to machine (M2M) system in which an association identifier (AID) can duplicatedly granted to the STAs, the respective STAs can be prevented from being kept in awake state even without buffered traffic to the respective STAs themselves. As a result, in an M2M support WLAN system in which a low cost device is a main member, power efficiency can be improved.

MODE FOR INVENTION

Figure 1:
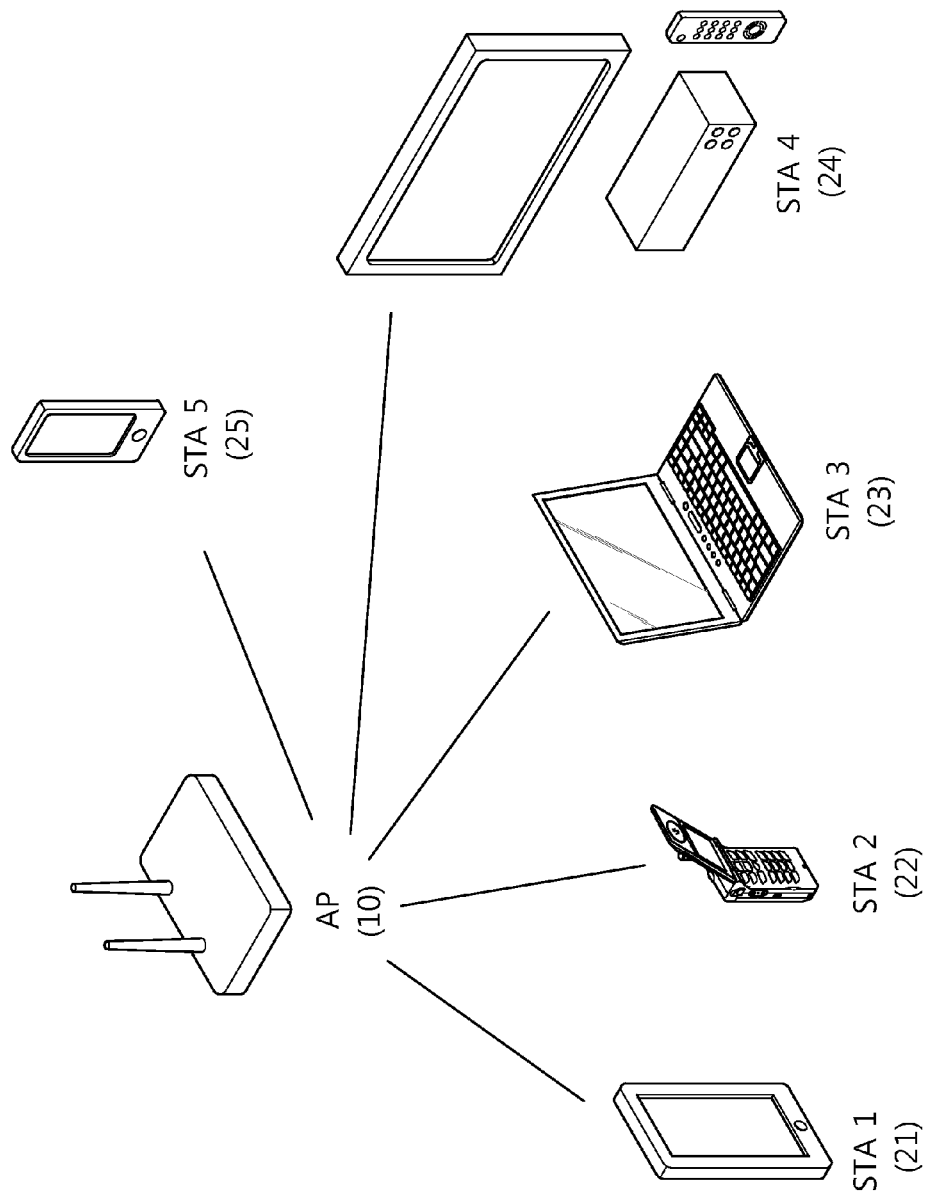
FIG. 1 is a diagram illustrating a configuration of a wireless local area network (WLAN) according to an exemplary embodiment of the present invention.

FIG. 1 is a diagram illustrating a configuration of a wireless local area network (WLAN) according to an exemplary embodiment of the present invention.

The WLAN system includes one or more basic service sets (BSS). The BSS is a set of stations (STAs) that are successfully synchronized to communicate with each other and is not a concept indicating a specific region.

An infrastructure BSS includes one or more non-AP stations (a non-AP STA1, a non-AP STA2, a non-AP STA3, a non-AP STA4, and a non-AP STA5), an access point (AP) providing a distribution service, and a distribution system (DS) connecting a plurality of APs. In the infrastructure BSS, the AP manages the non-AP STAs of the BSS.

On the contrary, an independent BSS (IBSS) is a BSS that operates in an Ad-Hoc) mode. Since the IBSS does not include the AP, the IBSS has a centralized management entity that performs a management function at the center. That is, in the IBSS, the non-AP STAs are managed in a distributed manner. In the IBSS, all STAs may be formed by movable STAs and since all of the STAs are not permitted to access the DS, all of the STAs constitute a self-contained network.

The STA is a predetermined functional entity including a medium access control (MAC) and a physical layer interface for a wireless medium that follow a regulation of an Institute of Electrical and Electronics Engineers (IEEE) 802.11 standard and includes both an AP and a non-AP station in a broad sense.

The non-AP STA as not the AP but the STA may be called another name such as a mobile terminal, a wireless device, a wireless transmit/receive unit (WTRU) , user equipment (UE), a mobile station (MS), or a mobile subscriber unit. Hereinafter, the non-AP STA will be denoted by the STA for easy description.

The AP is a functional entity that provides a connection to the DS via a wireless medium for an STA associated to the corresponding AP. In the infrastructure BSS including the AP, the STAs principally communicate with each other via the AP, but when a direct link is set, the STAs may also directly communicate with each other. The AP may be called a central controller, a base station (BS), a node B, a base transceiver system (BTS), or a site controller.

A plurality of infrastructure BSSs including the BSS may be interconnected through the distribution system (DS). The plurality of BSSs connected through the DS is called an extended service set (ESS). The APs and/or STAs included in the ESS may communicate with each other, and in the same ESS, the STA may move from one BSS to another BSS while continuously performing communications.

In FIG. 1, STAs 21, 22, 23, 24 and 25 may be allocated with an association ID (AID) while associating with the AP 10. The AID is solely used in one BSS. As one example, at present, in the WLAN system, the AID may be allocated with one of values of 1 to 2007. In this case, 14 bits may be allocated to the frame which the AP and/or STA transmits for the AID and the AID value may be allocated with 16383, but 2008 to 16383 may be set as preliminary values.

In the WLAN system according to the IEEE 802.11, a basic access mechanism is a carrier sense multiple access with collision avoidance (CSMA/CA) mechanism. The CSMA/CA mechanism is called a distributed coordination function (DCF) of the IEEE 802.11 MAC and basically adopts a "listen before talk" access mechanism. According to this type of access mechanism, the AP and/or STA senses a wireless channel or medium before starting transmission. As a sensing result, when it is sensed that the medium is in an idle status, the AP and/or STA starts frame transmission. On the contrary, when it is sensed that the medium is in an occupied status, the corresponding AP and/or STA does not start its own transmission but waits by setting a delay period for medium accessing.

The CSMA/CA mechanism includes even virtual carrier sensing in addition to physical carrier sensing in which the AP and/or STA directly senses the medium. The virtual carrier sensing is used to complement problems which may occur in accessing the medium, such as a hidden node problem, and the like. The MAC of the WLAN system uses a network allocation vector (NAV) for the virtual carrier sensing. The NAV is a value in which the AP and/or STA uses the medium at present or has an authorization to use the medium instructs a time left until the medium becomes a usable status to another AP and/or STA. Therefore, the value set as the NAV corresponds to a period in which the use of the medium is scheduled by the AP and/or STA that transmits the corresponding frame.

An IEEE 802.11 MAC protocol provides a hybrid coordination function (HCF) based on a point coordination function (PCF), the polling based synchronization access manner, in which all receiving APs and/or STAs periodically poll so as to receive a data frame together with the DCF. The HCF includes an enhanced distributed channel access (EDCA) based on an access manner for a provider to provide the data frame to a plurality of users and an HCF controlled channel access (HCCA) using a contention free based channel access manner using a polling mechanism. The HCF includes a medium access mechanism for improving a quality of service (QoS) of the WLAN and may transmit QoS data to both a contention period (CP) and a contention free period (CFP).

In order to overcome a limit for a communication speed noted as a weak point in the WLAN, IEEE 802.11n has been provided as a technological standard established comparatively recently. The IEEE 802.11n aims at increasing the speed and reliability of a network and extending an operating distance of a wireless network. In more detail, the IEEE 802.11n supports high throughput (HT) in which a data processing speed is equal to or higher than maximum 540 Mbps, and is based on a multiple inputs and multiple outputs (MIMO) technology using multiple antennas at both a transmitter and a receiver in order to minimize a transmission error and optimize a data speed.

In the STA, as the propagation of the WLAN is activated and further, an application using the WLAN is diversified, the necessity for a new WLAN system for higher throughput than a data processing speed supported by the IEEE 802.11n has come to the fore in recent years. A next-generation WLAN supporting a very high throughput (VHT) as a next version of the IEEE 802.11n WLAN system is one of IEEE 802.11 WLAN systems which have been newly proposed in recent years in order to support a data processing speed of 1 Gbps or higher in an MAC service access point (SAP).

The next-generation WLAN system supports transmission of a multi user multiple input multiple output (MU-MIMO) mode in which a plurality of STAs simultaneously access a channel in order to efficiently use the wireless channel. According to the MU-MIMO transmission mode, the AP may transmit a packet to one or more STAs which are MIMO-paired simultaneously.

A TV WS represents a frequency band which is in the idle status which remains by digitalization of an analog TV of U.S.A. and represents, for example, a band of 54 to 698 MHz. However, this is just an example and the TV WS may be a licensed band which a licensed user may preferentially use. The licensed user means a user who is licensed to use the licensed band and may be called even other names such as a licensed device, a primary user, an incumbent user, and the like.

The AP and/or STA that operates in the TV WS needs to provide a protection function for the licensed user. The reason is that the licensed user is preferred in using the TV WS band. For example, when the licensed user such as a microphone already uses a specific WS channel which is a frequency band which is divided in terms of a regulation so as to have a specific bandwidth in the TV WS band, the AP and/or STA is incapable of using a frequency band corresponding to the WS channel for protecting the licensed user. Further, when the licensed user uses a frequency band used for frame transmission and/or reception at present, the AP and/or STA should stop using the corresponding frequency band.

Therefore, the AP and/or STA needs to first perform a procedure of determining whether a specific frequency band in the TV WS band is available, that is, whether the licensed user is present in the frequency band. Determining whether the licensed user is present in the specific frequency band is called spectrum sensing. As a spectrum sensing mechanism, an energy detection mode, a signature detection mode, and the like are used. When the intensity of a received signal is equal to or more than a predetermined value, it may be determined that the licensed user is using the frequency band or when a DTV preamble is detected, the licensed user is using the frequency band.

Meanwhile, continuously sensing the channel for frame transmission/reception causes continuous power consumption of the STA. Since power consumption in a receiving status is not significantly different from power consumption in a transmitting status, continuously maintaining the receiving status causes the STA that operates by a battery to generate comparatively more power consumption. Therefore, since the STA's sensing the channel while continuously maintaining a reception stand-by status may cause inefficient power consumption without a particular increment effect in terms of WLAN throughput in the WLAN system, the corresponding channel sensing may not be suitable in terms of power management.

In order to complement such a problem, the WLAN system supports a power management (PM) mode of the STA. The power management mode of the STA is classified into an active mode and a power save (PS) mode. The STA basically operates in the active mode. The STA that operates in the active mode keeps an awake state. That is, the STA keeps a normally operable state such as the frame transmission/reception or the channel sensing.

The STA that operates in the PS mode operates while switching between a doze state and the awake state. The STA that operates in the doze state operates with minimum power and does not receive a wireless signal transmitted from the AP, which includes he data frame. Further, the STA that operates in the doze state does not perform the channel sensing.

Since the power consumption of the STA decreases as the STA operates in the doze state as long as possible, an operating period of the STA increases. However, since the STA is incapable of transmitting/receiving the frame in the doze state, the STA is disabled to operate unconditionally long in the doze state. When there is a frame which the STA that operates in the doze state is to transmit to the AP, the STA may transmit the frame by switching to the awake state. However, when there is a frame which the AP is to transmit to the STA that operates in the doze state, the STA is incapable of receiving the frame and the STA is incapable of finding that the frame to be received is present. Therefore, the STA determines whether the frame to be transmitted to the STA itself is present and when the frame is present, the STA may need to switch to the awake state in accordance with a specific period in order to receive the frame. The AP may correspondingly transmit the frame to the STA. The frame transmission will be described with reference to FIG. 2.

Figure 2:
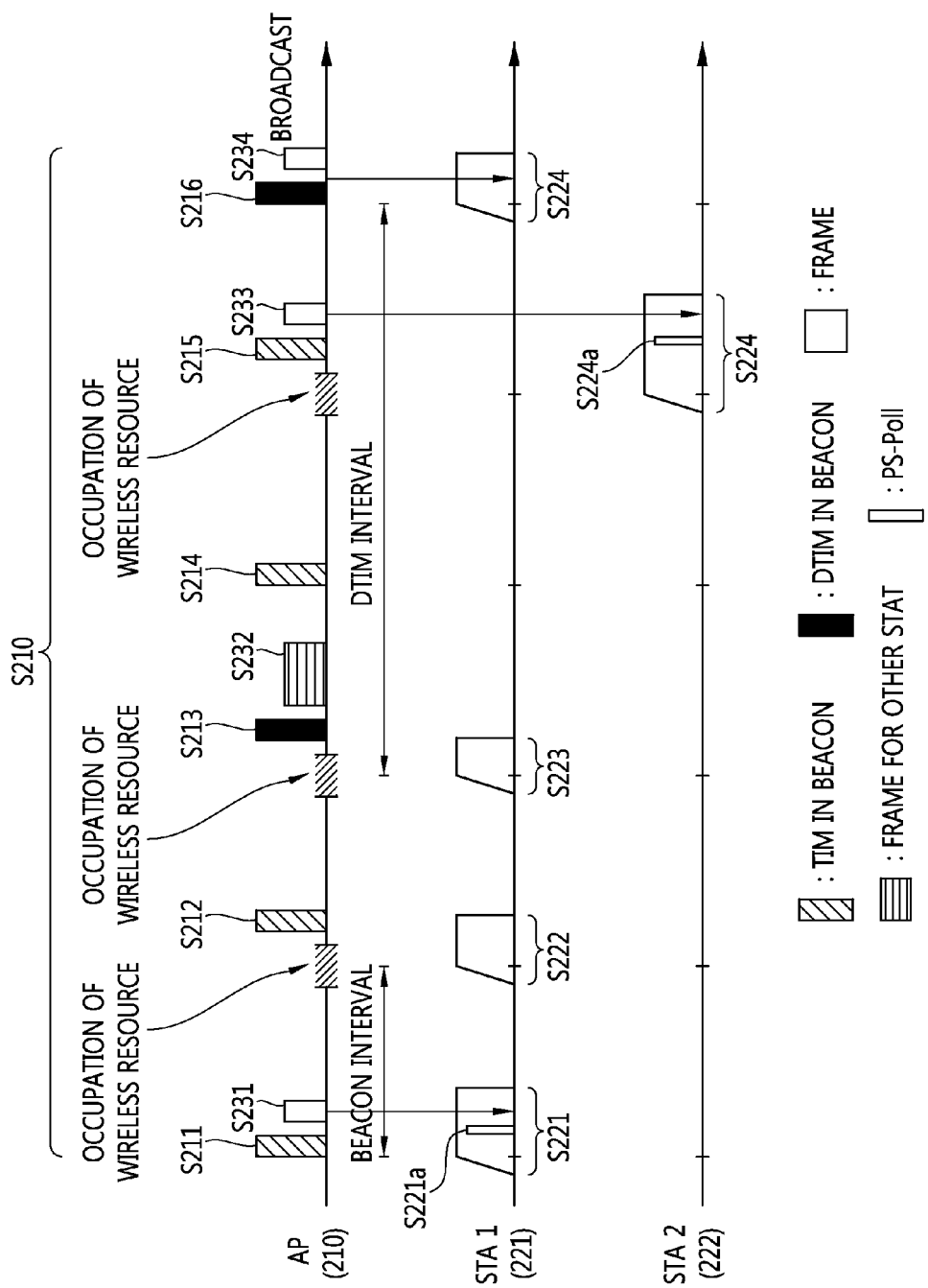
FIG. 2 is a diagram illustrating one example of a power management operation.

FIG. 2 is a diagram illustrating one example of a power management operation.

Referring to FIG. 2, an AP 210 transmits a beacon frame to STAs in the BSS at a predetermined period. The beacon frame includes a traffic indication map (TIM) information element. The TIM element includes information indicating that buffered traffic for STAs connected with the AP 210 is present and the AP is to transmit a frame. The TIM element includes a TIM used to indicate a unicast frame and a delivery traffic indication map used to indicate a multicast or broadcast frame.

The AP 210 transmits the DTIM once whenever transmitting the beacon frame three times.

An STA1 221 and an STA2 222 are STAs that operate in the PS mode. The STA1 221 and STA2 222 may be configured to switch from the doze state to the awake state at a wakeup interval of a specific period and to receive a TIM element transmitted by the AP 210.

A specific wakeup interval may be set so that the STA1 221 switches to the awake state at a beacon interval to receive the TIM element. Therefore, when the AP 210 transmits the beacon frame for the firs time (S211), the STA1 221 switches to the awake state (S221). The STA1 221 receives the beacon frame and acquires the TIM element. When the acquired TIM element indicates that a frame to be transmitted to the STA1 221 is present, the STA1 221 transmits to the AP 210 a PS poll frame to request frame transmission to the AP 210 (S221a). The AP 210 transmits a frame to the STA1 221 to correspond to the PS poll frame (S231). The STA1 221 that completes receiving the frame operates while switching to the doze state again.

Since the AP 210 is in a busy medium state in which another device accesses a medium at the time of transmitting the beacon frame for the second time, the AP 210 is incapable of transmitting the beacon frame at an accurate beacon interval and may transmit the beacon frame at a delay time (S212). In this case, an operating mode of the STA1 221 is switched to the awake state at the beacon interval, but the STA1 221 is incapable of receiving the beacon frame which is delayed and transmitted and switches to the doze state again (S222).

When the AP 210 transmits the beacon frame for the third time, the corresponding beacon frame may include the TIM element set by the DTIM. However, since the AP 210 is in the busy medium, the AP 210 delays and transmits the beacon frame (S213). The STA1 221 operates while switching to the awake state at the beacon interval and may acquire the DTIM through the beacon frame transmitted by the AP 210. Since the DTIM acquired by the STA1 221 indicates that there is no frame to be transmitted to the STA1 221 and a frame for another STA is present, the STA1 221 operates while switching to the doze state again. The AP 210 transmits the beacon frame and thereafter, transmits the frame to the corresponding STA (S232).

The AP 210 transmits the beacon frame for the fourth time (S214). However, since the STA1 221 is incapable of acquiring information indicating that buffered traffic to the STA1 221 is present by receiving the TIM element twice before, the wakeup interval for receiving the TIM element may be adjusted. Alternatively, when the beacon frame transmitted by the AP 210 includes signaling information for adjusting the wakeup interval value of the STA1 221, the wakeup interval value of the STA1 221 may be adjusted. In the present example, the STA1 221 switches the operating state in order to receive the TIM element at the beacon interval, but may be configured to switch the operating state thereof once every three beacon intervals. Therefore, since the STA 221 keeps the doze state when the AP 210 transmits a fourth beacon frame (S214) and transmits a fifth beacon frame (S215), the STA1 221 is incapable of acquiring the corresponding TIM element.

When the AP 210 transmits the beacon frame for the sixth time (S216), the STA1 221 operates while switching to the awake state and acquires the TIM element included in the beacon frame (S224). Since the TIM element is a DTIM indicating that the broadcast frame is present, the STA1 221 receives the broadcast frame transmitted by the AP 210 without transmitting the PS poll frame to the AP 210 (S234).

Meanwhile, the wakeup state set in the STA2 222 may be set at a longer period than the STA1 221. Therefore, when the AP 210 transmits the beacon frame for the fifth time (S215), the STA2 222 switches to the awake state to receive the TIM element (S224). The STA2 222 finds that a frame to be transmitted to the STA2 222 itself is present through the TIM element and transmits the PS poll frame to the AP 210 in order to request transmission (S224a). The AP 210 transmits a frame to the STA2 222 to correspond to the PS poll frame (S233).

In order to manage the power save mode as illustrated in FIG. 2, the TIM element includes a TIM indicating whether the frame to be transmitted to the STA itself is present or a DTIM indicating whether the broadcast/multicast frame is present. The DTIM may be implemented by setting a field of the TIM element.

A detailed response procedure of the STA that receives the TIM element may refer to FIGS. 3 and 5 below.

Figure 3:
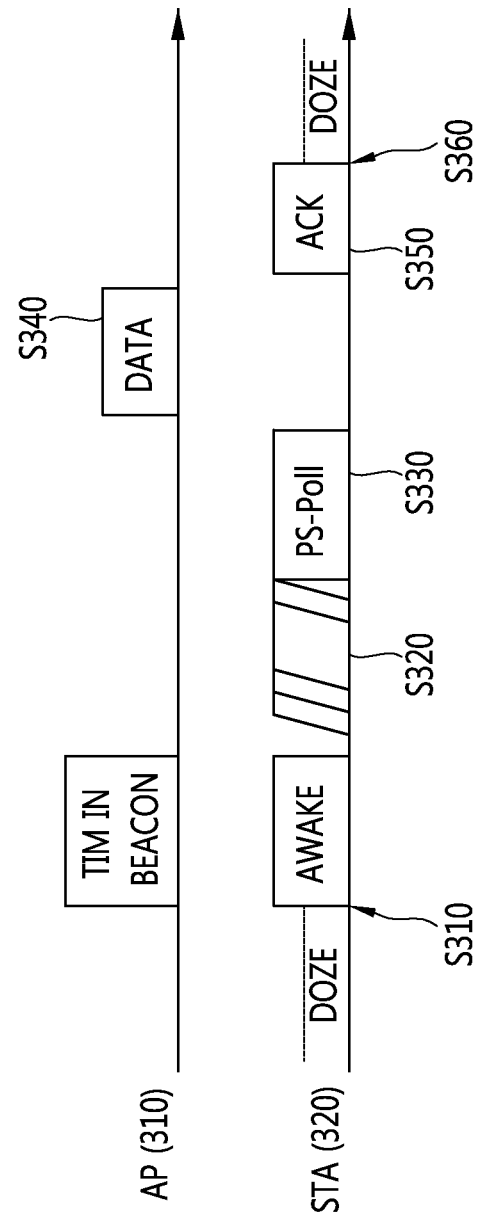
FIG. 3 is a flowchart illustrating one example of a response procedure of an AP in a TIM protocol.

FIG. 3 is a flowchart illustrating one example of a response procedure of an AP in a TIM protocol.

Referring to FIG. 3, an STA 320 switches an operating state from a doze state to an awake state in order to receive a beacon frame including a TIM from an AP 310 (S310). The STA 320 analyzes the received TIM element to find that buffered traffic to be transmitted to the STA 320 itself is present.

The STA 320 contends with other STAs for medium access for transmitting the PS poll frame (S320) and transmits the PS poll frame in order to request transmission of a data frame to the AP 310 (S330).

The AP 310 that receives the PS poll frame transmitted by the STA 320 transmits a frame to the STA 320. The STA 320 receives the data frame and transmits an acknowledgement (ACK) frame to the AP 310 as a reception response to the received data frame (S350). Thereafter, the STA 320 switches the operating mode to the doze state again (S360).

As illustrated in FIG. 3, the AP may transmit data at a specific time after receiving the PS poll frame unlike an immediate response to transmit the data frame immediately after receiving the PS poll frame from the STA.

Figure 4:
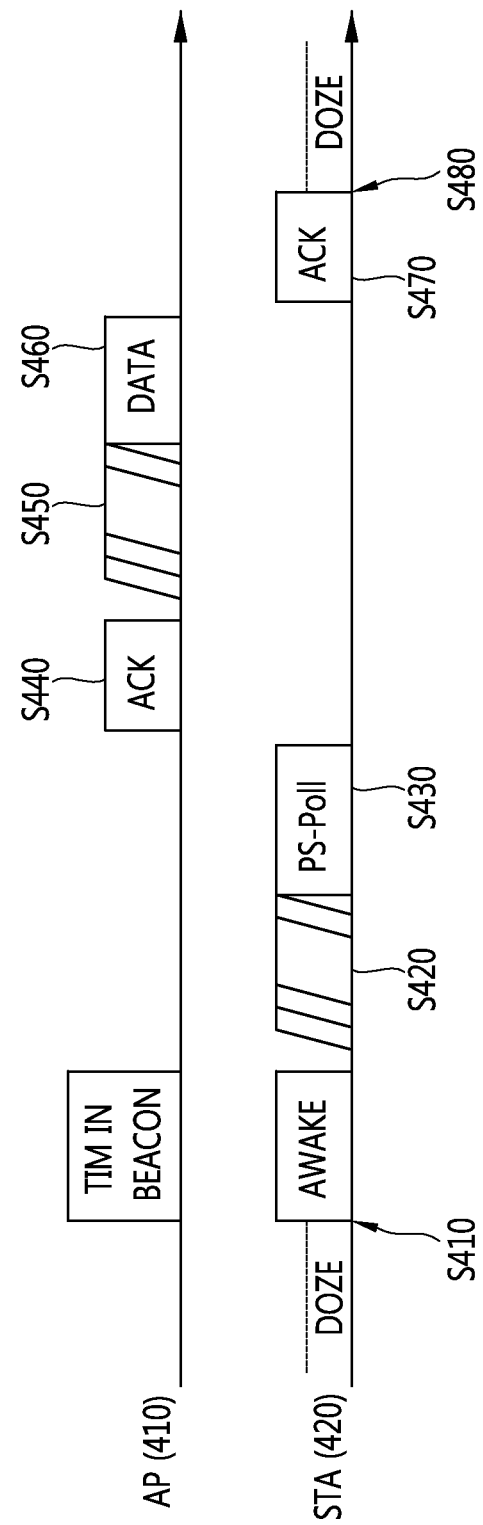
FIG. 4 is a flowchart illustrating another example of the response procedure of the AP in the TIM protocol.

FIG. 4 is a flowchart illustrating another example of a response procedure of an AP in a TIM protocol.

Referring to FIG. 4, an STA 420 switches an operating state from a doze state to the awake state in order to receive a beacon frame including a TIM from an AP 410 (S410). The STA 420 analyzes the received TIM element to find that buffered traffic to be transmitted to the STA 420 itself is present.

The STA 420 contends with other STAs for medium access for transmitting the PS poll frame (S420) and transmits the PS poll frame in order to request transmission of a data frame to the AP 410 (S430).

When the AP 410 is incapable of prepare the data frame during a specific temporal interval such as a short interframe space even after receiving the PS poll frame, the AP 410 transmits an ACK frame to the STA 420 instead without directly transmitting the data frame (S440). This is a characteristic of a deferred response different from step S340 in which the AP 310 of FIG. 3 immediately transmits the data frame to correspond to the PS poll frame.

When the AP 410 transmits the ACK frame and thereafter, prepares the data frame, the AP 410 performs contending (S450) and thereafter, transmits the data frame to the STA 420 (S460).

The STA 420 transmits the ACK frame to the AP 410 as a reception response (S470) and switches the operating mode to the doze state (S480).

When the AP transmits the DTIM to the STA, a procedure of a TIM protocol which is performed subsequently may be different.

Figure 5:
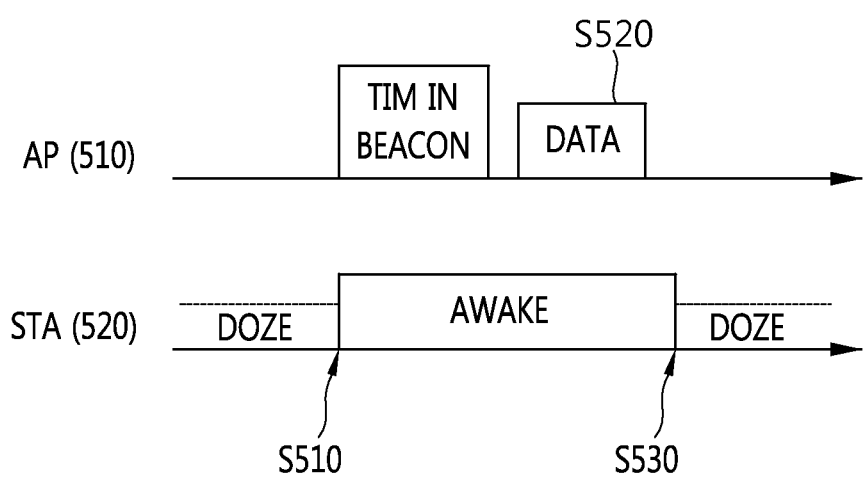
FIG. 5 is a flowchart illustrating a procedure of the TIM protocol by a DTIM.

FIG. 5 is a flowchart illustrating a procedure of the TIM protocol by a DTIM.

Referring to FIG. 5, STAs 520 switch operating states from a doze state to an awake state in order to receive a beacon frame including a TIM element from an AP 510 (S510). The STAs 520 may find that a multicast/broadcast frame is to be transmitted through a received DTIM.

The AP 520 transmits a beacon frame including the DTIM and thereafter, transmits the multicast/broadcast frame (S520). The STAs 520 receive the multicast/broadcast frame transmitted by the AP 510 and thereafter, switch the operating states to the doze state again (S530).

In the method for managing the power save mode based on the TIM protocol with reference to FIGS. 2 to 5, the STAs may verify whether the data frame to be transmitted is present due to the buffered traffic through STA identification information included in the TIM element. The STA identification information may be information associated with an association identifier (AID) which is an identifier which the STA is assigned with while being associated with the AP. The STA identification information may be set to directly indicate the AIDs of the STAs with the buffered traffic or set as a bitmap type in which a bit order corresponding to an AID value is set as a specific value. The STAs may find that the buffered traffics for themselves are present when the STA identification information indicates its own AID.

In the power save mode operation, the AP indicates that the buffered traffic is present to the STA and the STA operates in the power save mode based on the TIM element and/or DTIM element transmitted by the AP. The TIM element may have a maximum length of 256 bytes and the beacon frame including the TIM element is generally transmitted at the lowest data rate. Accordingly, as the beacon frame includes the TIM element, the size of the beacon frame is increased and a time required to transmit the beacon frame may be significantly extended. Therefore, reception power of the STA is increased.

A TIM broadcast is presented in order to complement such a disadvantage. In the TIM broadcast, the TIM element is not included in the beacon frame but the TIM element is included in a TIM frame to be separately transmitted. Further, the TIM frame may be transmitted at higher data rate than transmission rate for the beacon frame. Therefore, a time which the STA requires to acquire the TIM element of the TIM frame may be relatively shortened.

Figure 6:
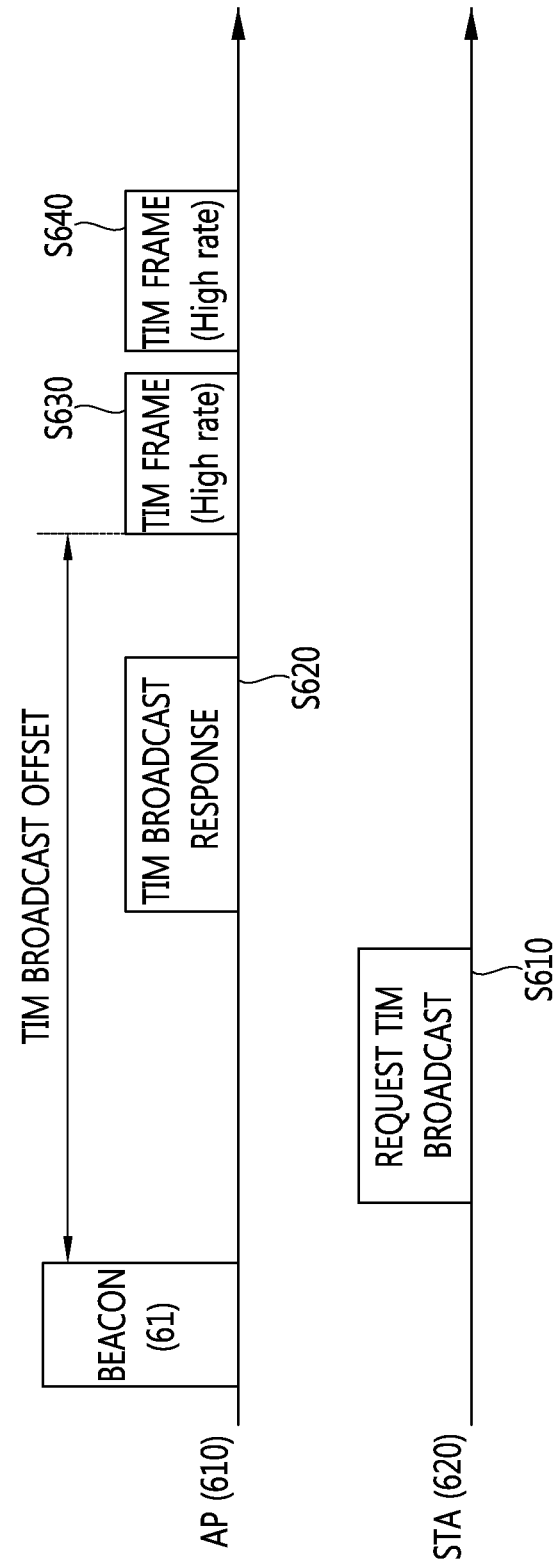
FIG. 6 is a diagram illustrating a method for operating a power save mode based on a TIM broadcast.

FIG. 6 is a diagram illustrating a method for operating a power save mode based on a TIM broadcast.

Referring to FIG. 6, an STA 620 transmits a TIM broadcast request frame to an AP 610 (S610). The TIM broadcast request frame includes a TIM broadcast request element and a corresponding format is illustrated in FIG. 7.

Figure 7:
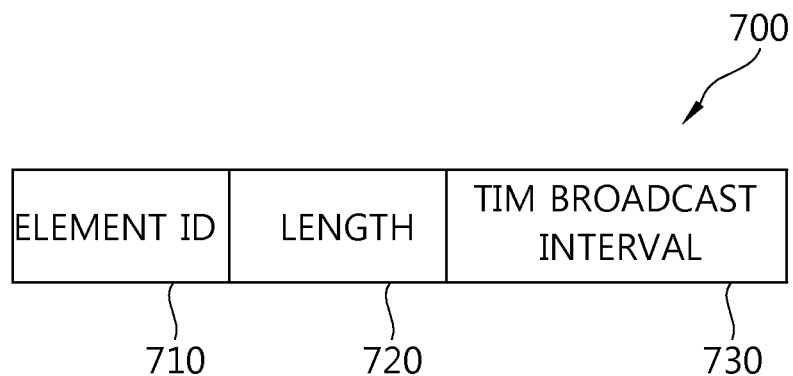
FIG. 7 is a block diagram illustrating a TIM broadcast request element format.

FIG. 7 is a block diagram illustrating a TIM broadcast request element format.

Referring to FIG. 7, a TIM broadcast request element 700 includes an element ID field, 710, a length field 720, and a TIM broadcast interval field 730. The element ID field 710 indicates that the corresponding element is the TIM broadcast request element 700. The length field 720 indicates the length of the TIM broadcast request element 710.

The TIM broadcast interval field 730 indicates a transmission interval of the TIM frame requested by the STA 620. The transmission interval of the requested TIM frame may be expressed as the multiple of the beacon interval.

Referring back to FIG. 6, the AP 610 transmits a TIM broadcast response frame to the STA as a response to the TIM broadcast request frame (S620). The TIM broadcast response frame includes a TIM broadcast response element and a format of the corresponding element is illustrated in FIG. 8.

Figure 8:
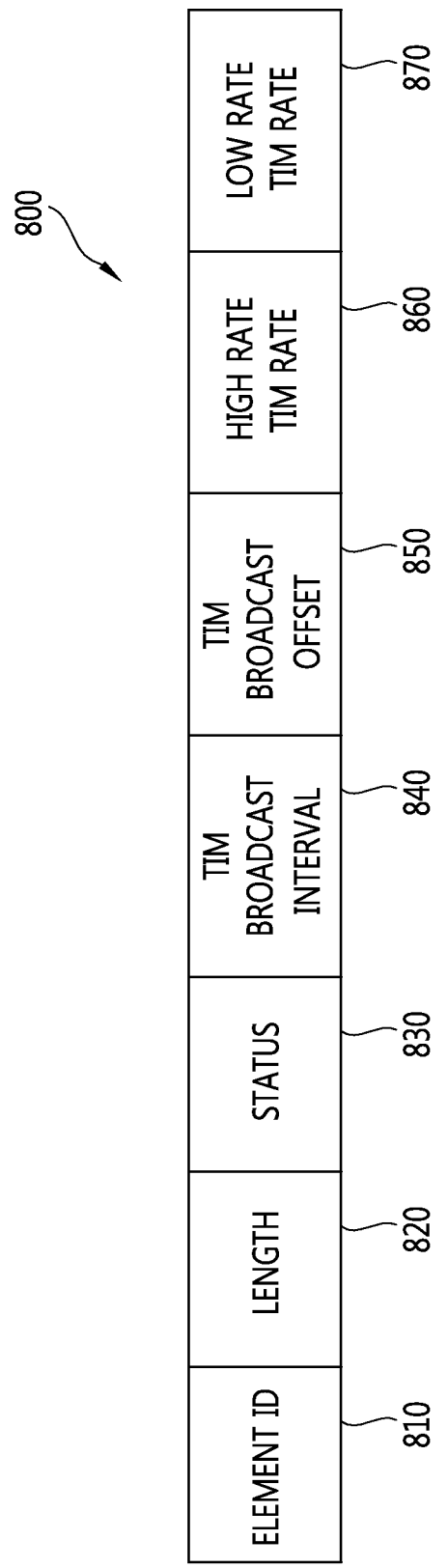
FIG. 8 is a block diagram illustrating a TIM broadcast response element format.

FIG. 8 is a block diagram illustrating a TIM broadcast response element format.

Referring to FIG. 8, a TIM broadcast response element 800 includes an element ID field 810, a length field 820, a status field 830, a TIM broadcast interval field 840, a TIM broadcast offset field 850, a high rate TIM rate field 860, and a low rate TIM rate field 870.

The element ID field 810 indicates that the corresponding element is the TIM broadcast response element 800. The length field 820 indicates the length of the TIM broadcast response element 800.

The status field 830 indicates a response status to the requested TIM frame interval indicated by the TIM broadcast interval field 730 of the TIM broadcast request element 700. The status field 830 may be set to indicate one of acceptance of the requested TIM frame interval, acceptance/existence of an effective timestamp in the TIM frame, refusal, and ignorance.

The TIM broadcast interval field 840 indicates a planned TIM frame transmission interval. The planned TIM frame transmission interval may be expressed as the multiple of the beacon interval.

The TIM broadcast offset field 850 indicates how offset the frame is transmitted with based on a target beacon transmission time (TBTT). In an example of the power save mode management based on the TIM broadcast illustrated in FIG. 6, the TBTT may correspond to a time when a beacon frame 61 is transmitted before the TIM broadcast request frame is transmitted.

The high rate TIM rate field 860 indicates data rate used to transmit the TIM frame transmitted at high rate. The low rate TIM rate field 870 indicates data rate used to transmit the TIM frame transmitted at low rate.

Referring back to FIG. 6, the AP 610 transmits the TIM frame transmitted at high rate after a time indicated by the TIM broadcast offset field 850 elapses at the time of transmitting the beacon frame 61. Subsequently, the AP 610 transmits the TIM frame transmitted at low rate (S640). The respective TIM frames are broadcasted by the AP 610.

Meanwhile, in recent years, a machine to machine (M2M) takes attention as a next-generation technology. A standardization work is in progress in order to support a WLAN communication protocol supported under such a communication environment. The number of AIDs supported in the WLAN system at present may be short to be used in the WLAN system that supports an M2M application. When the M2M application is applied to the WLAN environment, the number of STAs connected to one AP may be significantly increased. Under such an environment, one AID may be assigned to two or more STAs.

Duplicated assignment of the AID causes a problem in a method of notifying the buffered traffic to the STAs based on the TIM element. The reason is that the STA determines whether the buffered traffic to the STA itself is present based on the AID included in the TIM element. Therefore, even in the case of not its own buffered traffic, the AID that is duplicatedly assigned is verified to be misrecognized.

A method of separately transferring the TIM elements to the STAs, respectively is presented in order to prevent such a problem. The method may be supported by the TIM broadcast which transfers the TIM elements through transmission of the individual TIM frames.

Meanwhile, the TIM broadcast starts in a request from the STA. Therefore, when there is no request from the STA, the AP does not transmit the TIM frame including the TIM element without transmitting the TIM broadcast response frame of itself. This means that when one AID is duplicatedly assigned to two or more STAs, the AP is incapable of processing the buffered traffic by distinguishing two or more STAs and the STA may operate in the awake state even in the case of not its own buffered traffic. Accordingly, it is difficult to normally manage a normal power save mode of the STA and power efficiency is decreased.

Further, once setting of the TIM broadcast is determined, changing the setting of the TIM broadcast in midstream may not be easy. Therefore, a method for operating a power save mode in the WLAN system is presented, which supports the M2M based on the TIM broadcast protocol having such a characteristic.

Figure 9:
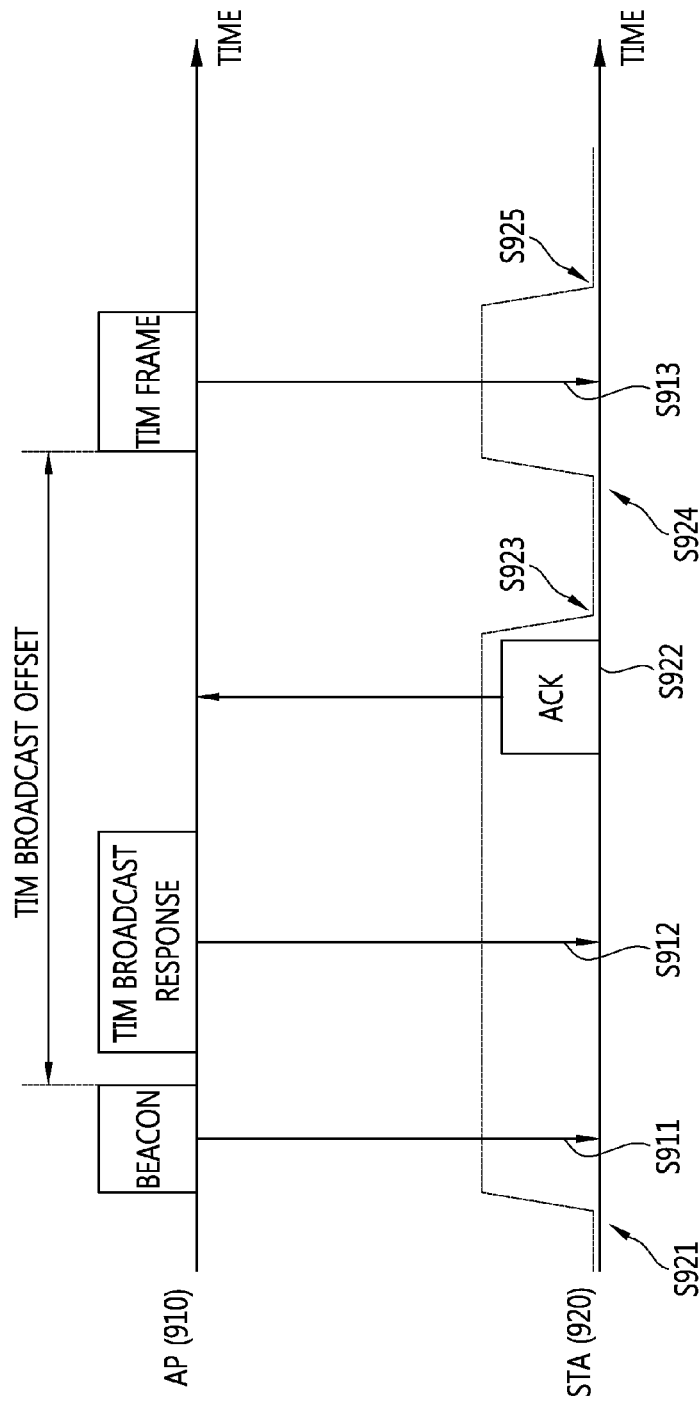
FIG. 9 is a diagram illustrating a method for operating a power save mode according to an exemplary embodiment of the present invention.

FIG. 9 is a diagram illustrating a method for operating a power save mode according to an exemplary embodiment of the present invention. It is assumed that the STA operates in the power save mode and it is assumed that the STA is able to operate while switching to the awake state to receive the beacon frame and the frame transmitted from the AP.

Referring to FIG. 9, an AP 910 transmits the beacon frame (S911). An STA 920 switches from the doze state to the awake state (S921) to receive the beacon frame at the time of transmitting the beacon frame. However, the STA 920 is not required to switch to the awake state every beacon period and may be sufficient to switch to the awake in order to receive a specific beacon frame.

The AP 910 transmits the beacon frame and thereafter, transmits the TIM broadcast response frame to the STA (S912). The TIM broadcast response frame includes the TIM broadcast element and a format of the corresponding element and information included in the corresponding element are described as above. In this example, the TIM broadcast response frame may be expressed as a TIM broadcast indication frame for distinguishment from a frame transmitted as a response to the request in FIG. 8.

The STA 920 that receives the TIM broadcast response frame transmits a reception acknowledgement (ACK) frame as a response to the received TIM broadcast response frame (S922) and operates while switching to the doze state (S923).

The STA 920 operates while switching to the awake state again after the time indicated by the TIM broadcast offset field included in the TIM broadcast response frame elapses or just before the time elapses, from the time of receiving the beacon frame in this example (S924).

The AP 920 transmits the TIM frame after the time indicated by the TIM broadcast offset field elapses from the TBTT (S913). Since the STA 920 operates while switching to the awake state before the time of transmitting the TIM frame, the STA receives the TIM frame to acquire information included in the TIM element. The STA 920 operates while switching to the doze state when there is no buffered traffic after receiving the TIM frame (S925). When the STA 920 verifies that there is the buffered traffic to the STA 920 itself through the TIM frame, the STA 920 may enter the doze state after receiving the frame for the buffered traffic from the AP 910.

According to the TIM broadcast protocol, different STAs may receive different TIM frames. The TIM broadcast protocol may be usefully applied to a WLAN system in which the AID is duplicated, illustrated in FIG. 10.

Figure 10:
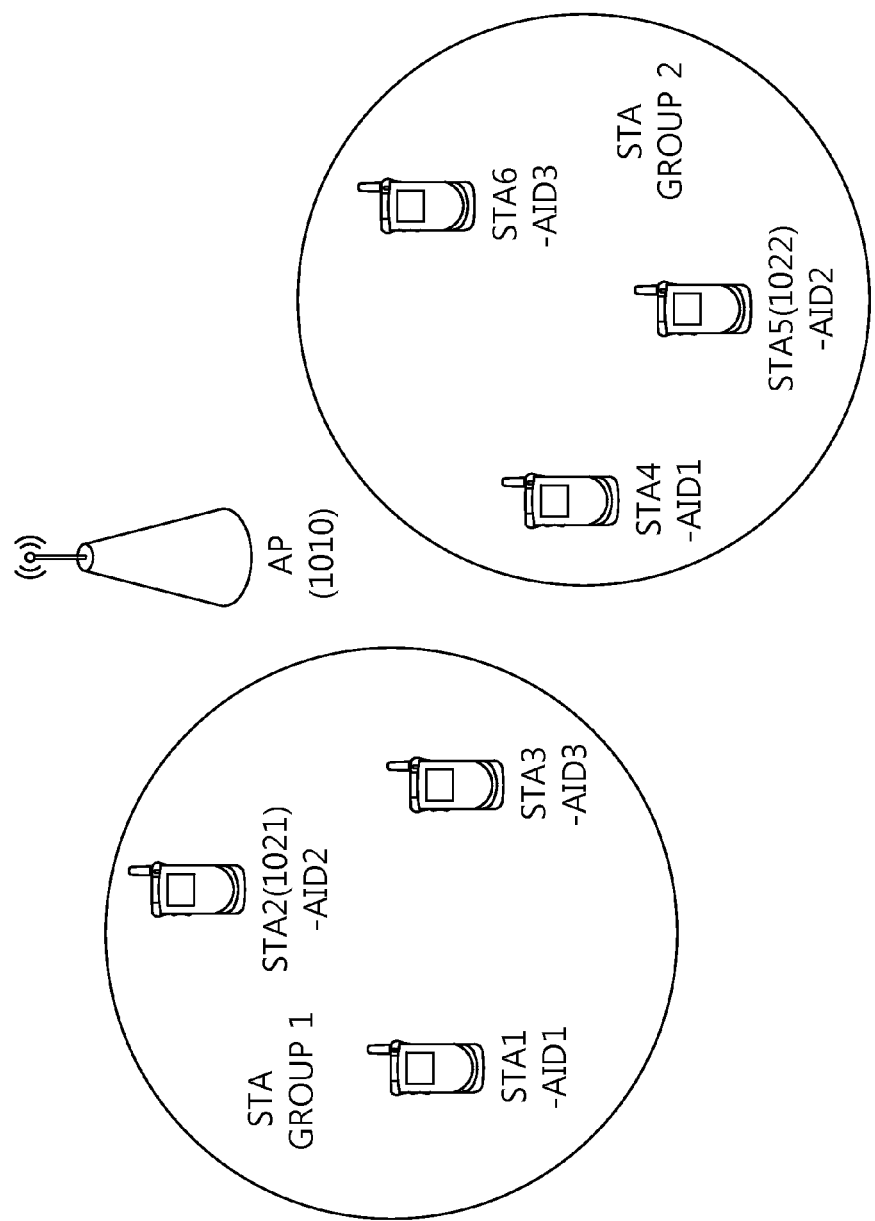
FIG. 10 is a diagram illustrating one example of a WLAN system to which a method for operating a power save mode based on a TIM broadcast can be applied according to an exemplary embodiment of the present invention.

FIG. 10 is a diagram illustrating one example of a WLAN system to which a method for operating a power save mode based on a TIM broadcast can be applied according to an exemplary embodiment of the present invention.

The STAs are assigned with the AID when the STAs are associated with the AP. Since very many STAs may coexist in the WLAN system supporting the M2M, the AID may be duplicatedly assigned to the STAs as described above.

Referring to FIG. 10, an STA1 and an STA4 are duplicatedly assigned with an AID1, an STA2 1021 and an STA5 1022 are duplicatedly assigned with an AID2, and an STA3 and an STA6 are duplicatedly assigned with an AID3. The STA1, the STA2 1021, and the STA3 are grouped into STA group 1 and the STA4, the STA5 1022, and the STA6 are grouped into STA group 2. The STA group is assumed as a set of STAs without the duplicated AID, and it is assumed that the STA groups are logically configured, thereby an AP 1010 may have information on the STA group and the STAs included in the group. The STA group may be divided based on a device type of each STA, the position of the STA, and a traffic type for the STA.

When the STA having the buffered traffic is indicated by the bitmap type STA identification information based on the existing TIM element, for example, the AP 1010 sets a second bit of the bitmap to 1 in order to notify there buffered traffic to the STA having the AID2 of STA group 1 is present. When the AP 1010 transmits the TIM element, the STA2 1021 of STA group 1 may find that buffered traffic for the STA2 1021 itself is present based on the STA identification information of the TIIM element. Therefore, the STA2 1021 keeps the awake state. Meanwhile, the buffered traffic is not originally present in the STA5 1022 of STA group 2, but since the STA5 1022 is duplicatedly assigned with the AID2, the STA5 1022 continuously keeps the awake state. Therefore, a phenomenon is caused, in which an STA that need not keep the awake state without the buffered traffic unnecessarily keeps the awake state and a problem in power consumption occurs. Such a problem may be solved through a method that allows the STAs duplicatedly assigned with the AID to receive different TIM frames by using the TIM broadcast.

Figure 11:
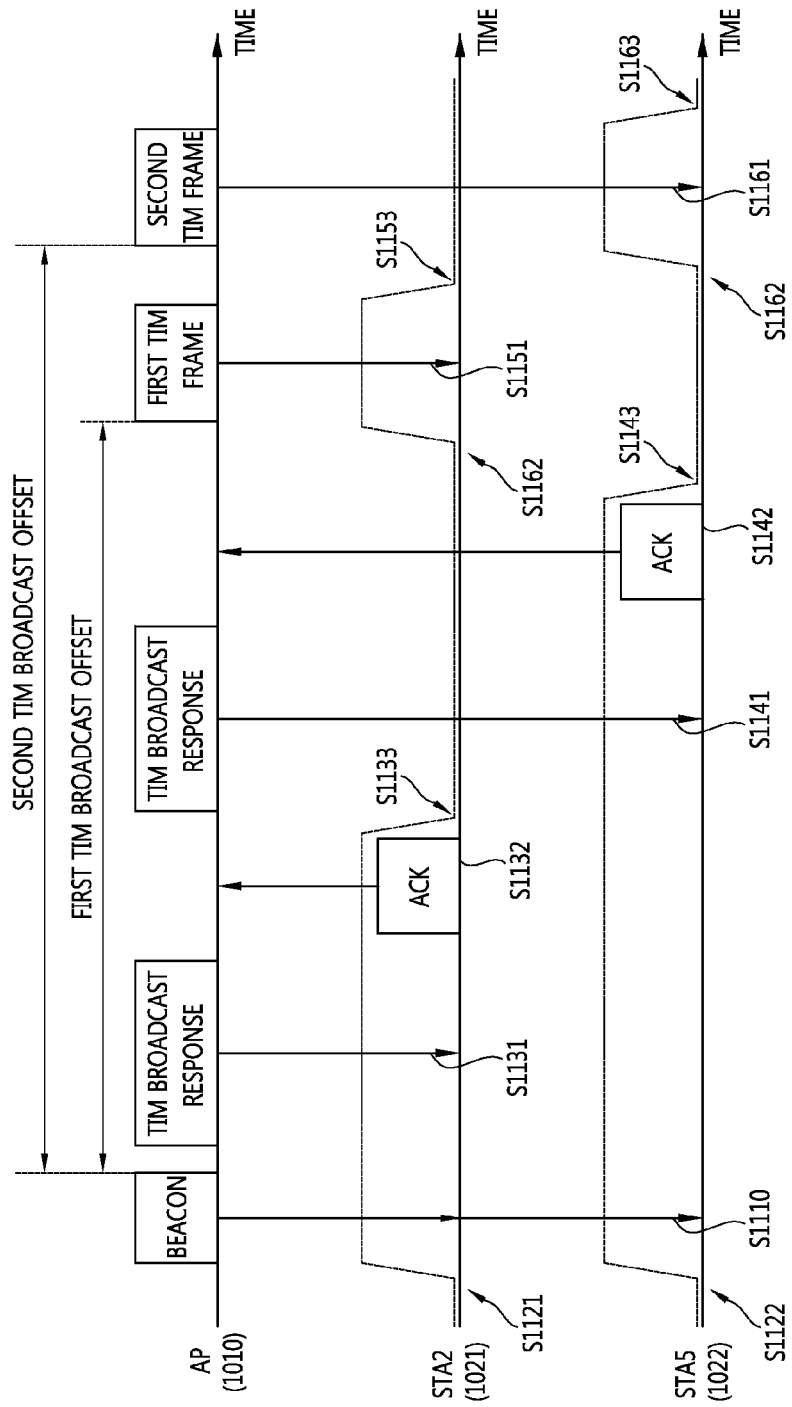
FIG. 11 is a diagram illustrating one example of a method for operating a power save mode according to an exemplary embodiment of the present invention.

FIG. 11 is a diagram illustrating one example of a method for operating a power save mode according to an exemplary embodiment of the present invention. FIG. 11 illustrates a method for operating a power save mode by the AP 1010, the STA2 1021, and the STA5 1022 in the WLAN system illustrated in FIG. 10.

Referring to FIG. 11, an AP 1010 transmits the beacon frame (S1110). It is assumed that the STA2 1021 and the STA5 1022 operate while switching from the doze state to the awake state at the time of transmitting the beacon frame (S1121 and S1122). Further, a time just after the beacon frame is transmitted by step S1110 is assumed as the TBTT.

The STA2 1021 and the STA5 1022 keep the awake state within a specific time after receiving the beacon frame. Keeping the awake state is used to receive the TIM broadcast response frame. However, when the TIM element is included in the beacon frame, the STA2 1021 and the STA5 1022 may selectively keep the awake state or switch to the doze state depending on the presence of the buffered traffic in accordance with the existing TIM protocol.

The AP 1010 transmits the beacon frame and thereafter, transmits the TIM broadcast response frame to the STA2 1021 (S1131). The TIM broadcast element is included in the TIM broadcast response frame, and information for transmitting the TIM frame to the STA2 1021 is included in the corresponding element.

The STA2 1021 that receives the TIM broadcast response frame transmits the ACK frame to the AP 1010 as a response to the TIM broadcast response frame (S1132), and operates while switching to the doze state (S1133).

The AP 1010 transmits the TIM broadcast response frame to the STA5 1022 (S1141), and the STA5 1022 that receives the frame transmits the ACK frame to the AP 1010 as a response to the frame (S1142) and thereafter, operates while switching to the doze state (S1143).

Respective TIM broadcast offset fields indicating different offset values may be included in the TIM broadcast elements received by the respective STAs. As one example, it is assumed that a first TIM broadcast offset is indicated with respect to the STA2 1021 and a second TIM broadcast offset is indicated with respect to the STA5 1022.

The AP 1010 transmits a first TIM frame including the TIM element at a time indicated by the first TIM broadcast offset (S1151). The STA2 1021 switches to the awake state at the corresponding time (S1152) to receive the first TIM frame. The STA2 1021 that receives the first TIM frame operates while switching to the doze state (S1153). On the contrary, since the STA5 1022 operates in the doze state at the time of transmitting the first TIM frame, the STA5 1022 is incapable of receiving the first TIM frame.

The AP 1010 transmits a second TIM frame including the TIM element at a time indicated by the second TIM broadcast offset (S1161). The STA5 1022 switches to the awake state at the corresponding time (S1162) to receive the first TIM frame. The STA5 1022 that receives the first TIM frame operates while switching to the doze state (S1163). On the contrary, since the STA2 1021 operates in the doze state at the time of transmitting the second TIM frame, the STA2 1021 is incapable of receiving the second TIM frame.

According to the method for operating a power save mode of FIG. 11, since different STAs receive different TIM frames, the different STAs thereafter receive different TIM elements for operating the power save mode. Therefore, in the WLAN system in which the AID may be duplicatedly assigned, the power save mode may be normally operated even using the existing bitmap type STA identification information of the TIM element.

In the example of FIG. 11, information associated with the TIM broadcast offset may be differently set for each STA group. Since it is assumed that STAs duplicatedly assigned with the AID are not present in the STA group, the STAs may normally verify that the buffered traffic for the STAs themselves is present even by providing the same TIM broadcast offset to one STA group.

In the example illustrated in FIG. 11, each of the STA2 1021 and the STA5 1022 operates while switching to the doze state after receiving the TIM frame. This is an example in which it is assumed that there is no buffered traffic after verifying whether the buffered traffic to the STA2 1021 and the STA5 1022 themselves are present based on the TIM element. When the buffered traffic for each of the STA2 1021 and the STA5 1022 is present, the STA2 1021 and the STA5 1022 may operate while switching to the doze state after exchanging the data frame for the buffered traffic with the AP 1010. A communication method associated with the frame exchange of the STA2 1021 and the STA5 1022 will be described with reference to FIGS. 12 and 13.

Figure 12:
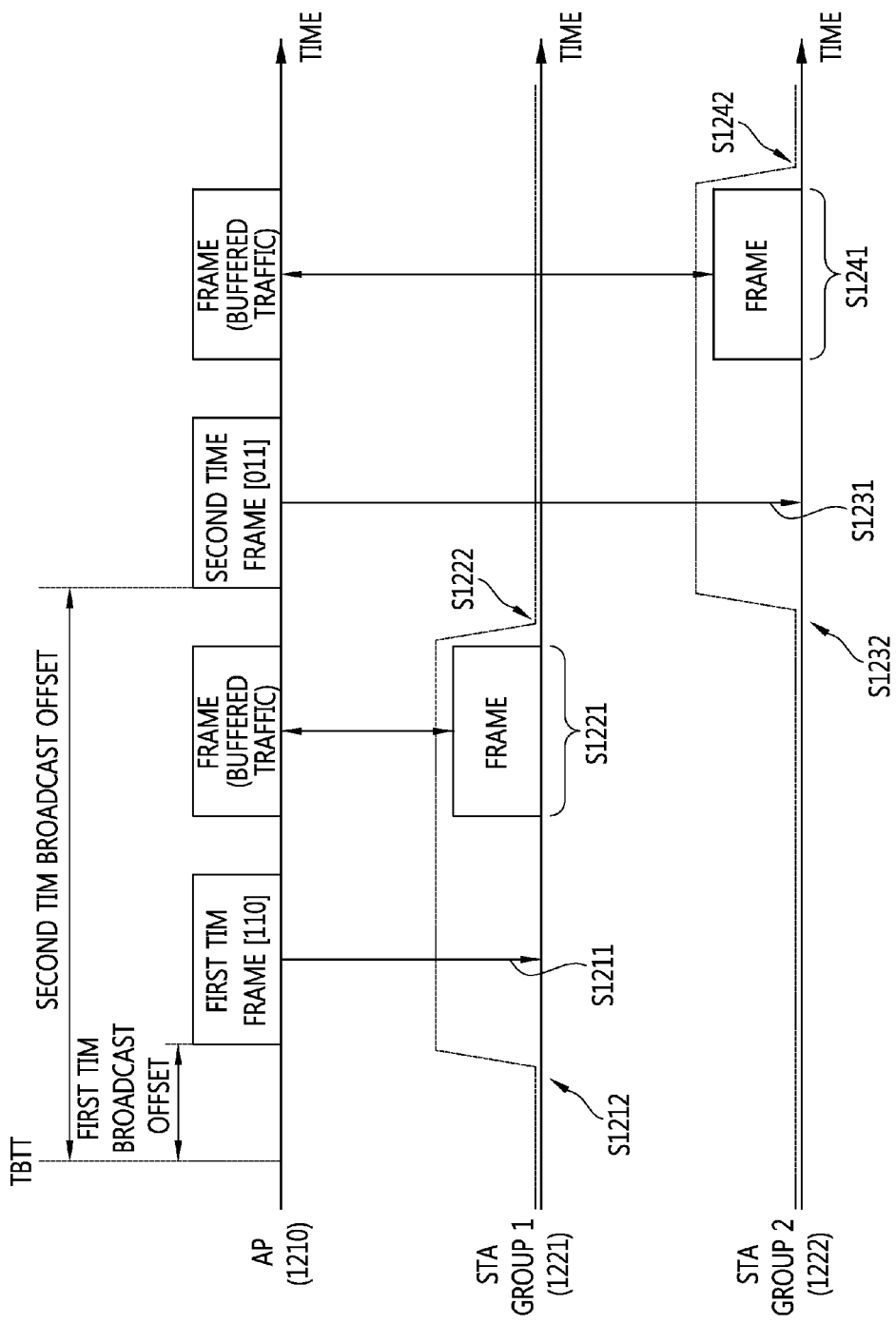
FIG. 12 is a diagram illustrating one example of a communication method according to an exemplary embodiment of the present invention.

FIG. 12 is a diagram illustrating one example of a communication method according to an exemplary embodiment of the present invention. It is assumed that the TIM broadcast offset is already given to the individual STAs included in STA group 1 and STA group 2 through transmission/reception of the TIM broadcast response frame. The offset is not particularly requested to be given to all STAs included in a specific STA group and the AP may assign the offset to the specific STA regardless of the STA group. Further, it is assumed that the TBTT is already given to STA groups 1 and 2.

Referring to FIG. 12, the AP 1210 transmits the first TIM frame for the STAs included in STA group 1 at the time indicated by the first TIM broadcast offset for STA group 1 (S1211). The STAs included in the first STA group switch to the awake state at the time indicated by the offset (S1212) and receive the first TIM frame. The STA identification information of the TIM element included in the first TIM frame is configured by '110'. Therefore, STAs with the AID1 and the AID2 among the STAs included in STA group 1 perform the frame exchange associated with the buffered traffic with the AP 1210 after receiving the first TIM frame (S1221). The STA which completes the frame exchange operates while switching to the doze state (S1222). STAs with AIDs other than the AID1 or the AID2 among the STAs included in STA group 1 may operate while switching to the doze state immediately after receiving the first TIM frame (not illustrated).

The AP 1210 transmits the second TIM frame for the STAs included in STA group 2 at a time indicated by the second TIM broadcast offset for STA group 2 (S1231). The STAs included in the second STA group switch to the awake state at the time indicated by the offset (S1232) and receive the second TIM frame. The STA identification information of the TIM element included in the second TIM frame is configured by '011'. Therefore, STAs with the AID2 and the AID3 among the STAs included in STA group 2 perform the frame exchange associated with the buffered traffic with the AP 1210 after receiving the second TIM frame (S1241). The STA which completes the frame exchange operates while switching to the doze state (S1242). STAs with AIDs other than the AID2 or the AID3 among the STAs included in STA group 2 may operate while switching to the doze state immediately after receiving the second TIM frame (not illustrated).

A method may also be presented, which performs the frame exchange associated with the buffered traffic after preferentially transmitting the TIM frames by changing a frame exchange order between the AP and the STAs unlike the aforementioned content. This may refer to a method for operating a power save mode, which is illustrated in FIG. 13.

Figure 13:
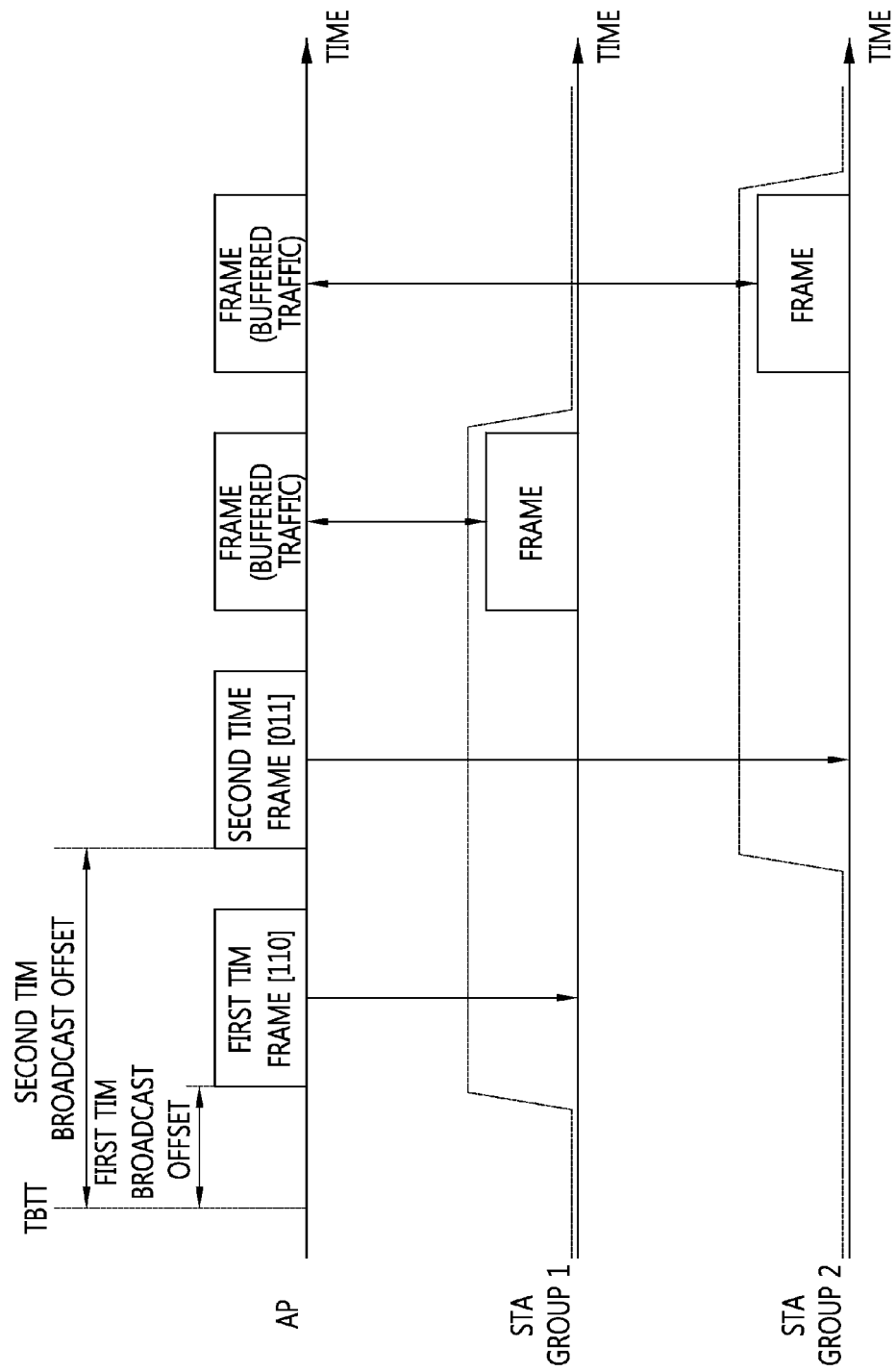
FIG. 13 is a diagram illustrating another example of a communication method according to an exemplary embodiment of the present invention.

FIG. 13 is a diagram illustrating another example of a communication method according to an exemplary embodiment of the present invention. In the example of FIG. 13, the assumption associated with the TIM broadcast offset and the TBTT in FIG. 12 is similarly applied.

Referring to FIG. 13, the AP transmits the first TIM frame and the second TIM frame for STA group 1 and STA group 2. Unlike FIG. 12, STA group 1 receives the first TIM frame and thereafter, STA group 2 receives the second TIM frame without the frame exchange of the STA group 1 with the AP. Thereafter, the AP and the STAs having the buffered traffic exchange the frame based on information on the respectively received TIM elements.

Meanwhile, since STAs that verify that the buffer traffic is present through the first TIM frame among the STAs of STA group 1 keep the awake state, the STAs receive the second TIM frame. In this case, the STAs of STA group 1 may manage the power save mode based on the TIM element included in the preferentially received first TIM frame and disregard the TIM element included in the second TIM frame.

The TIM broadcast response frame may be used even when the AP intends to change the setting of the TIM broadcast. The AP changes the TIM broadcast offset, the interval, the rate, and the like through transmission of the TIM broadcast response frame to notify the changed TIM broadcast offset, interval, rate, and the like to the STA.

Figure 14:
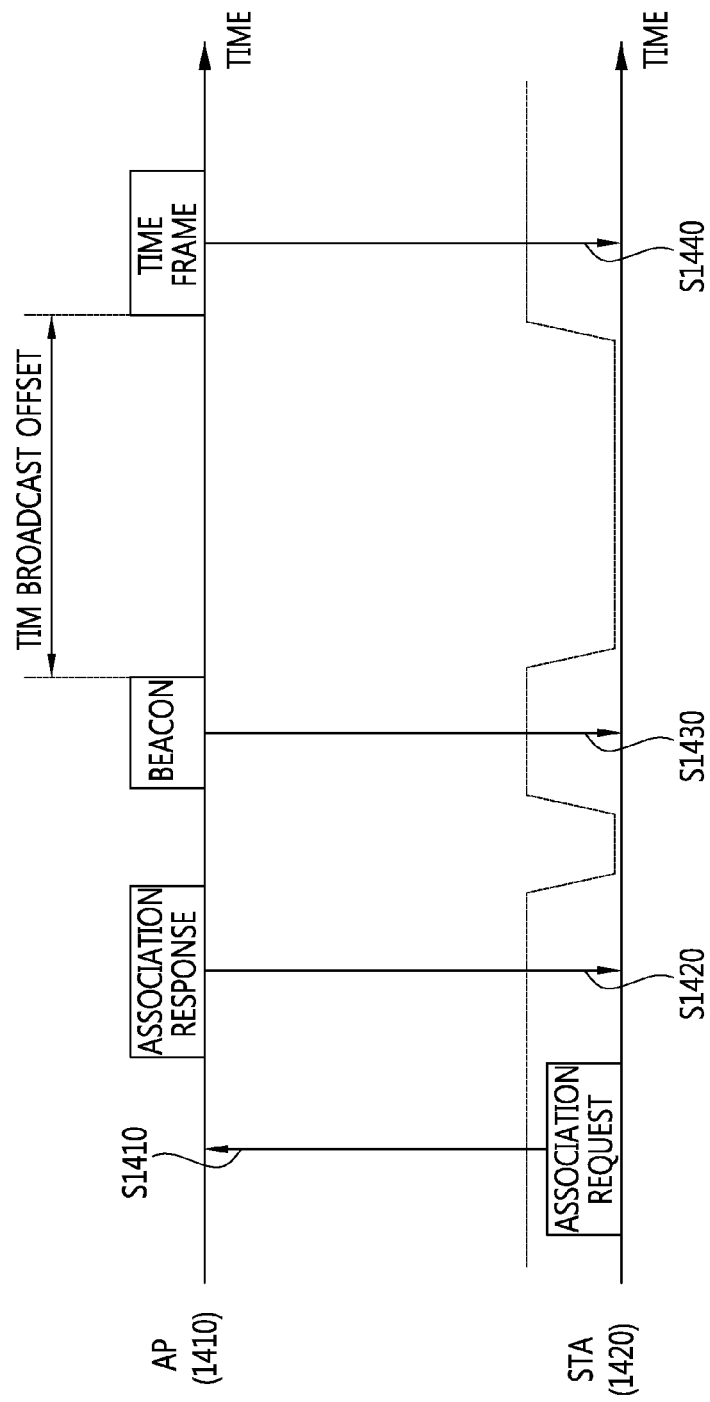
FIG. 14 is a diagram illustrating a method for operating a power save mode according to an exemplary embodiment of the present invention.

Meanwhile, transmitting a separate TIM broadcast response may cause overhead. The reason is that the STA needs to be generally subjected to control associated with the power save mode from the AP, from association, in the M2M supporting system. Therefore, the TIM broadcast element is included in an association response frame to be transmitted. Since the STA may acquire the TIM broadcast element while association, overhead may be reduced, which occurs as the AP separately transmits the TIM broadcast element to the STA. FIG. 14 is referred.

FIG. 14 is a diagram illustrating a method for operating a power save mode according to an exemplary embodiment of the present invention.

Referring to FIG. 14, an STA 1420 transmits an association request frame to request association to an AP 1410 (S1410). The association request frame includes information associated with the STA 1420.

The AP 1410 transmits an association response frame to the STA 1420 as a response to the association request frame (S1420). The association response frame includes information associated with a result for the association request, information on a BSS operated by the AP 1410, information assigned to the STA 1420 by association of the AP 1410 and the STA 1420, and the TIM broadcast element.

The AP 1410 transmits the beacon frame (S1430) and transmits the TIM frame after a time zone indicated by the TIM broadcast offset (S1440). The STA switches to the awake state at the time of transmitting the TIM frame to receive the TIM frame and thereafter, performs a power save mode operation based on the TIM element.

Figure 15:
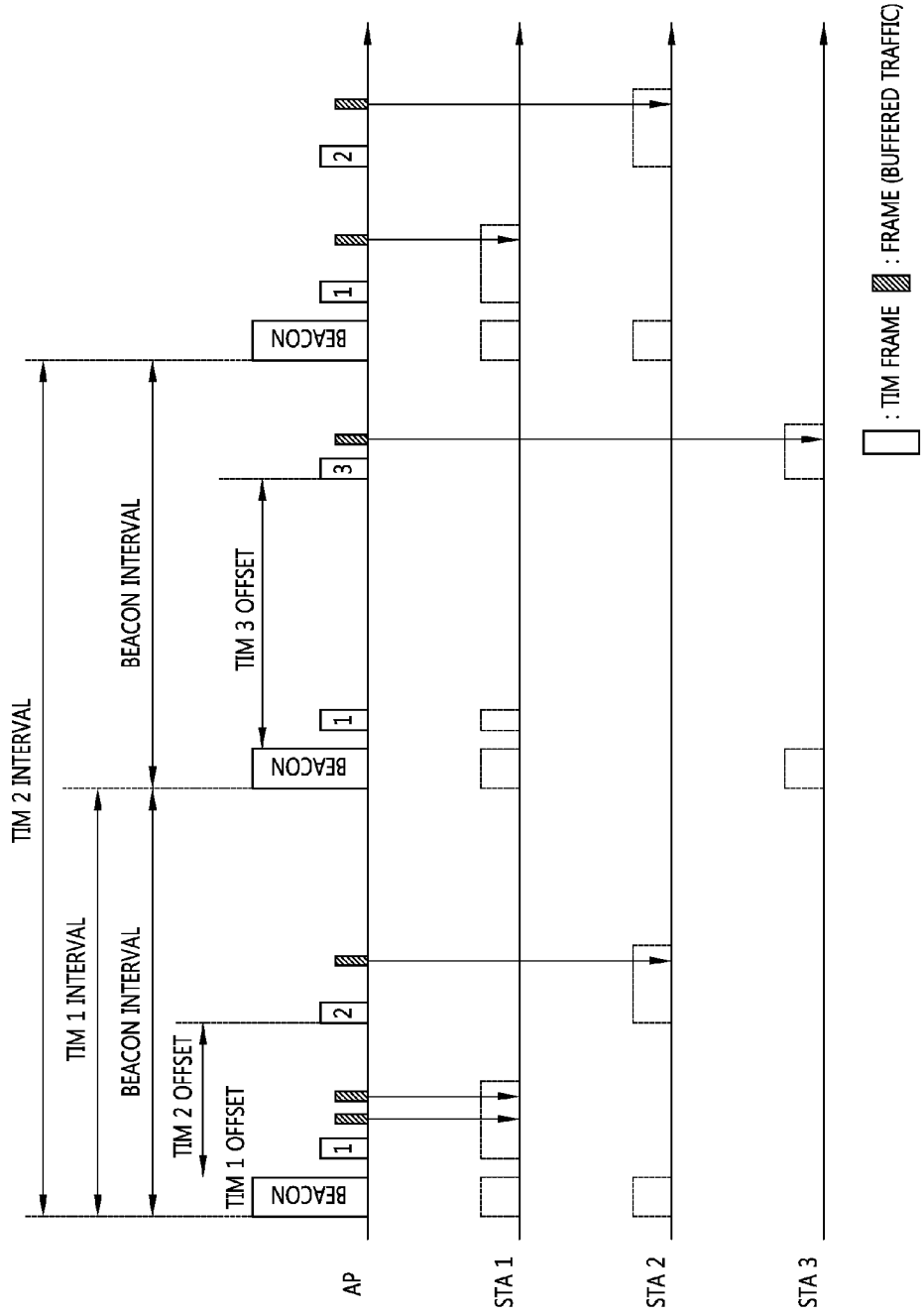
FIG. 15 is a diagram illustrating a communication method based on power save mode operation according to an exemplary embodiment of the present invention.

FIG. 15 is a diagram illustrating a detailed method of a method for operating a power save mode, which adopts a TIM broadcast protocol according to an exemplary embodiment of the present invention.

Referring to FIG. 15, a TIM1, a TIM2, and a TIM3 are set as the TIM frames for the STA1, the STA2, and the STA3. The TIM frame for each STA may be distinguished based on the TIM broadcast offset and the TIM broadcast interval as described above.

The TIM1 is transmitted after an offset of the TIM1 elapses after every transmission of the beacon frame because the TIM broadcast interval is the same as the beacon interval. The TIM2 is transmitted after an offset of the TIM2 elapses after the beacon frame is transmitted twice because the TIM broadcast interval is twice the beacon interval. Similarly, in the TIM3, the TIM broadcast interval is longer than the beacon interval. The TIM3 is transmitted within the TIM offset after the beacon frame is transmitted three times or more based on the beacon frame (not illustrated) transmitted earlier than a first beacon frame which is illustrated.

Each STA operates while switching to the awake state at the time when the TIM frame to be received by each STA itself is transmitted. To this end, each STA is requested to operate while switching to the awake state when a beacon frame based on its own TBTT is transmitted. The STA1 switches to the awake state at the beacon interval to receive the beacon frame. The STA2 switches to the awake state once whenever the beacon interval elapses twice to receive the beacon frame. The STA3 switches to the awake state once whenever the beacon interval elapses three times or more to receive the beacon frame.

Each STA switches to the awake state at each TIM broadcast interval to receive the beacon frame and receives the TIM frame in accordance with the TIM offset to manage the power save mode.

Figure 16:
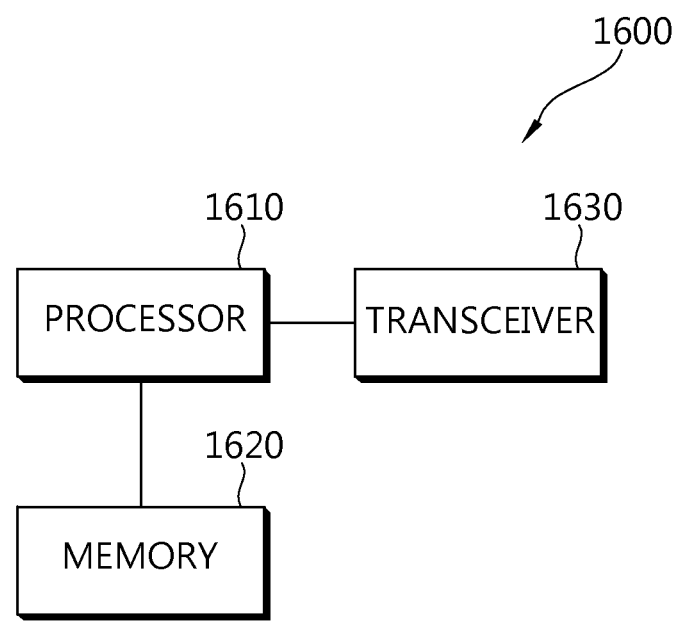
FIG. 16 is a block diagram illustrating a wireless apparatus in which the exemplary embodiment of the present invention can be implemented.

FIG. 16 is a block diagram illustrating a wireless apparatus in which the exemplary embodiment of the present invention can be implemented.

Referring to FIG. 16, a wireless apparatus 1600 includes a processor 1610, a memory 1620, and a transceiver 1630. The transceiver 1630 transmits and/or receives a wireless signal, however, the transceiver 1630 implements a physical layer of IEEE 802.11. The processor 1610 may be set to perform power save mode management based on the TIM broadcast in functional connection with the transceiver 1630. The processor 1610 is set to implement an MAC layer and/or a PHY layer of the WLAN system so as to implement the exemplary embodiments of the present invention, which are illustrated in FIGS. 2 to 15.

The processor 1610 and/or transceiver 1630 may include an application-specific integrated circuit (ASIC), other chipsets, a logic circuit, and/or a data processing device. When the exemplary embodiments are implemented by software, the aforementioned technique may be implemented by modules (a processing, a function, and the like) that perform the aforementioned functions. The modules are stored in the memory 1620 and may be executed by the processor 1610. The memory 1620 may be included in the processor 1610 and may be functionally connected with the processor 1610 by various known means which is separately positioned outside.

The invention claimed is:
1. A method for operating a power save mode in a wireless local area network (WLAN) system, comprising:
transmitting, by an access point (AP), a beacon frame to a first STA and a second STA;

transmitting, by the (AP), a first traffic indication map (TIM) broadcast indication frame to a first station (STA) in a beacon frame interval;

transmitting, by the AP, a second TIM broadcast indication frame to a second STA in the beacon frame interval;

transmitting, by the AP, a first TIM frame indicating buffered traffic for the first STA presenting the beacon frame interval; and transmitting, by the AP, a second TIM frame indicating buffered traffic for the second STA in the beacon frame interval, wherein the first TIM broadcast indication frame includes a first TIM offset field indicating a transmission time of the first TIM frame, wherein the second TIM broadcast indication frame includes a second TIM offset field indicating a second transmission time of the second TIM frame, and wherein the first STA and the second STA are assigned with the same association identifier (AID) when the STAs are associated with the AP.

2. The method of claim 1, wherein the first transmission time indicated by the first TIM offset field and the second transmission time indicated by the second TIM offset field are different from each other.

3. The method of claim 2, wherein the first transmission time of the first TIM frame is expressed by an offset time value which elapses from a transmission time of a specific beacon frame which the AP periodically transmits.

4. The method of claim 2, further comprising:
entering, by the first STA, a doze state after receiving the first TIM Broadcast indication frame, and
operating, by the first STA, while switching to an awake state at the time indicated by the first TIM offset field.

5. The method of claim 4, further comprising:
entering, by the second STA, the doze state after receiving the second TIM broadcast indication frame, and
operating, by the second STA, while switching to the awake state at the time indicated by the second TIM offset field.

6. The method of claim 1, wherein the first TIM frame includes information indicating the AID in order to notify that the buffered frame to the first STA is present.

7. The method of claim 6, wherein the second TIM frame includes information indicating the AID of the second STA in order to notify that the buffered frame to the second STA is present.

8. The method of claim 2, further comprising:
exchanging, by the AP, frames with the first STA and the second STA.

9. The method of claim 8, further comprising:
entering, by the first STA, the doze state when completing the frame exchange with the AP; and
entering, by the second STA, the doze state when completing the frame Exchange with the AP.

10. The method of claim 1,
wherein the first TIM frame is periodically transmitted, and
wherein the first TIM broadcast indication frame further includes a first TIM interval field indicating a transmission period of the first TIM frame.

11. The method of claim 10,
wherein the second TIM frame is periodically transmitted, and
wherein the second TIM broadcast indication frame further includes a second TIM interval field indicating a transmission period of the second TIM frame.

12. A wireless apparatus, comprising:
a transceiver configured to transmit and receive a radio signal; and
a processor operatively connected to the transceiver,
wherein the processor is configured to:
transmit a beacon frame to a first STA and a second STA;
transmit a first traffic indication map (TIM) broadcast indication frame to the first station (STA) in a beacon frame interval,
transmit a second TIM broadcast indication frame to the second STA in the beacon frame interval,
transmit a first TIM frame indicating a buffered traffic for the first STA in the beacon frame interval, and
transmit a second TIM frame indicating a buffered traffic for the second STA in the beacon frame interval,
wherein the first TIM broadcast indication frame includes a first TIM offset field indicating first transmission time of the first TIM frame,
wherein the second TIM broadcast indication frame includes a second TIM offset field indicating a second transmission time of the second TIM frame, and
wherein the first STA and the second STA are assigned with the same association identifier (AID) when the STAs are associated with the AP.

13. The wireless apparatus of claim 12, wherein the first transmission time indicated by the first TIM offset field and the second transmission time indicated by the second TIM offset field are different from each other.

* * * * *